United States Patent [19]
Giamati et al.

[11] Patent Number: 5,479,060
[45] Date of Patent: Dec. 26, 1995

[54] BRUSH ASSEMBLY FOR A ROTATING ICE PROTECTION SYSTEM

[75] Inventors: Michael J. Giamati, Akron; Tommy M. Wilson, Jr., Stow, both of Ohio

[73] Assignee: The B. F. Goodrich Company, Akron, Ohio

[21] Appl. No.: 236,276

[22] Filed: Apr. 29, 1994

[51] Int. Cl.$^6$ ................................................. H01R 39/08
[52] U.S. Cl. ..................................... 310/232; 244/134 D
[58] Field of Search ............................... 310/231, 232, 310/239, 242, 245, 247, 68 R, 68 C; 244/134 R, 134 D

[56] References Cited

U.S. PATENT DOCUMENTS

| | | | |
|---|---|---|---|
| 2,451,872 | 10/1948 | Rodgers | 310/232 |
| 2,628,794 | 2/1953 | Radtke et al. | 244/134 D |
| 2,638,295 | 5/1953 | Sheets | 310/232 |
| 2,759,145 | 8/1956 | Manley | 310/232 |
| 2,994,055 | 7/1961 | Olasin | 310/232 |
| 3,314,038 | 4/1967 | Rutten | 310/232 X |
| 3,657,514 | 4/1972 | Adams | 244/134 D |
| 4,136,295 | 1/1979 | Sweet | 310/289 |
| 4,386,749 | 6/1983 | Sweet et al. | 244/134 D |
| 5,020,741 | 6/1991 | Ziegler et al. | 244/134 D |
| 5,281,880 | 1/1994 | Sakai | 310/232 X |

OTHER PUBLICATIONS

"Handbook Of Spring Design", Spring Manufacturers Insitute, Inc., pp. 7, 12, 13, 14, 15 & 16.
"Transient Voltage Suppression", Fifth Edition, Copyright 1989 by Harris Corporation, pp. 9–4, 9–5, 9–15, 9–29.

*Primary Examiner*—Mark O. Budd
*Attorney, Agent, or Firm*—Kevin L. Leffel

[57] ABSTRACT

An improved brush assembly is provided for conducting electrical power from a fixed power system to a rotating ice protection system. The invention is especially adapted for use with an aircraft propeller ice protection system. According to an aspect of the invention, the brush assembly has a housing with a brush enclosure and an attachment leg that attaches the brush assembly to a mounting bracket with the brush enclosure spaced to one side of the mounting bracket. According to another aspect of the invention, an internally mounted transient voltage suppressor is provided with minimized impedance between the transient voltage suppressor and the power system connection thereby providing improved lightning protection. These and other features are provided which are described in detail and represent further improvements over prior brush assemblies.

41 Claims, 9 Drawing Sheets

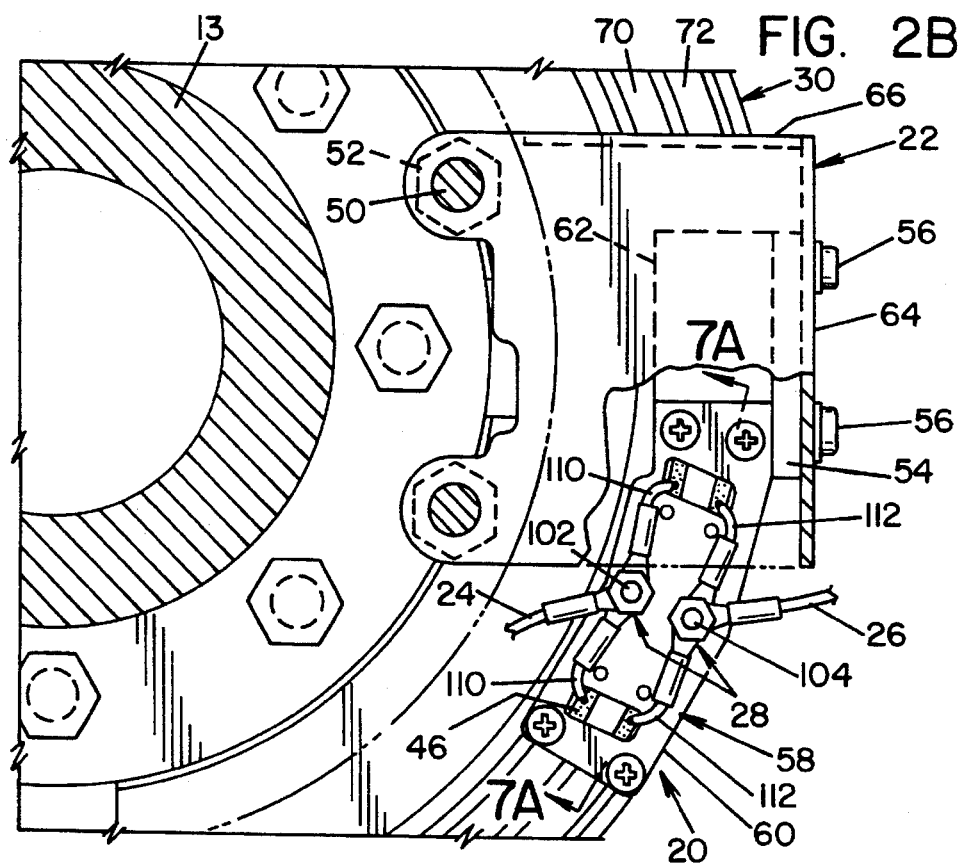
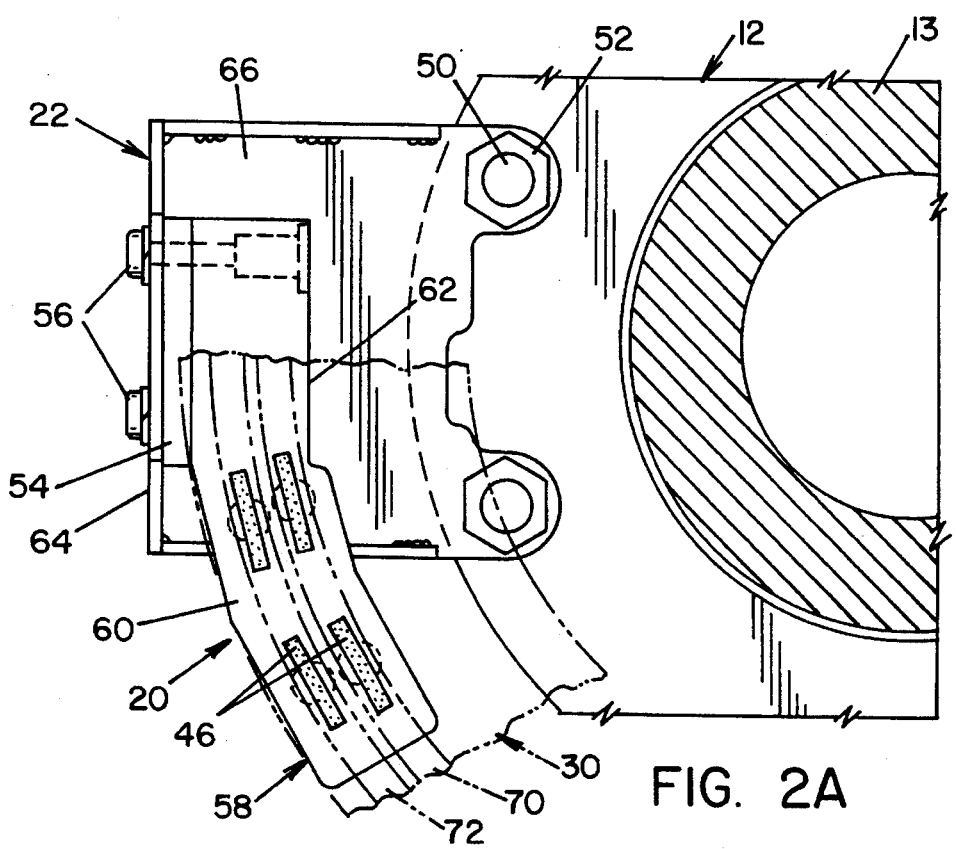

BRUSH ASSEMBLY FOR A ROTATING ICE PROTECTION SYSTEM

BACKGROUND OF THE INVENTION

This invention relates to an improved brush assembly for conducting electrical power from a fixed power system to a rotating ice protection system. The invention is especially adapted for use with an aircraft propeller ice protection system.

The hazards of aircraft flight in atmospheric icing conditions are well known. Through the years, various workers in the art have developed various techniques for removing or preventing ice accumulation encountered during flight. Certain techniques are particularly adapted to protect specific parts of an aircraft. An electrothermal propeller de-icing system is an example of a specialized system.

In an electrothermal propeller de-icing system, electrothermal de-icers are bonded to the inboard leading edge portions of the individual blades of an aircraft propeller. An example of an electrothermal propeller de-icer is presented in U.S. Pat. No. 4,386,749 issued Jun. 7, 1983 to Sweet et al. (the '749 patent). Electrical power is supplied to the individual de-icers through flexible wire harnesses that act as jumpers between each blade and the propeller bulkhead. The harnesses must be flexible since each blade must be able to rotate about its axis in order to effectuate pitch changes. An example of a wire harness is presented in U.S. Pat. No. 5,020,741, issued Jun. 4, 1991, to Ziegler et al. (the '741 patent).

Electrical power is conducted to the propeller ice protection system through a sliding contact comprising a slip ring assembly and a brush assembly. A typical arrangement is presented in U.S. Pat. No. 4,136,295, issued Jan. 23, 1979, to Sweet (the '295 patent). The slip ring assembly is mounted to the back of the propeller bulkhead facing the aircraft engine. According to a very common embodiment, the slip ring assembly includes a metal dish having an annular channel that receives a plurality of conductive slip rings formed from a copper alloy. The rings are potted into the channel with an epoxy compound which also provides the necessary dielectric insulation between the individual rings and the channel. The wire harnesses are electrically connected to the individual rings. In such manner, electrical power is transferred from the slip rings to the individual de-icers.

Electrical power is transferred to the slip rings through a brush assembly. A particular system may have one or more brush assemblies. Each assembly typically includes a housing that slidably receives two or more electrical brushes. The brushes are normally composed of a carbon based matrix. Carbon brushes and various carbon based brush compounds are well known in the brush and commutation art. A spring biases each brush against a slip ring. Some form of electrical power connection is attached to the housing. The power connection connects the brush assembly to the aircraft power system and may take the form of a shell-type connector or a number of a individual studs. Flexible shunts transfer power from the power connection to each brush. The aircraft power system typically includes a timing and switching device that switches power from brush to brush which thereby switches power to the various de-icers in a predetermined timed sequence.

There are various forms of brush assemblies adapted for use with a propeller ice protection system. An example of a commonly used brush assembly is provided in the '295 patent. This assembly is modular and comprises a series of brush modules that are stacked to provide the necessary number of brushes. An assembly formed as a single unit that predates the modular assembly is also described in the '295 patent. Other assemblies formed as a single unit are known in the art. Such assemblies may also incorporate multiple brushes per slip ring. For example, six brushes could be used in a three slip ring system with two brush riding on each ring. Using multiple brushes per slip ring may be advantageous if current levels are too high to use a single brush per ring.

Installation is difficult with all of these assemblies. The brush assembly is typically installed on a mounting bracket that is attached to the front of the engine facing the slip ring assembly. Each brush must be aligned radially with its respective slip ring. This is normally accomplished using shims between the bracket and the brush assembly. The assembly must also be adjusted to insure that each brush is either perpendicular or nearly perpendicular (with a specified small angular deviation) to its respective ring. In addition, the axial distance between the slip rings and the brush assembly must be appropriately adjusted. This adjustment process is greatly complicated when the mounting bracket blocks access to the brush assembly. Installation is particularly difficult with an "inside" mounting arrangement where the brush assembly is disposed between the mounting bracket and the engine drive shaft.

Installation is further complicated because of the manner in which prior brush assemblies are attached to the mounting bracket. Brush assemblies in the art typically have mounting holes through a portion of the housing for receiving a mounting screw. The mounting screw passes through the mounting bracket and housing and engages a nut which is tightened and clamps the housing against the mounting bracket. This arrangement presents an additional complication since one hand must be used to tighten the screw and another hand must be used to hold the nut. Holding the brush assembly in proper adjustment during this procedure can be very difficult, especially with an inside mounting arrangement.

The springs that bias the brushes against the slip rings have also presented problems in prior brush assemblies. The manner in which spring force is applied to the brush can cause the brush to tip in the housing and increase brush wear. Brush wear is also effected by variation in spring force during service. The helical springs used in many brush assemblies have a spring rate that causes brush force to vary as the brush shortens due to wear. For example, a new brush is longer and compresses the spring further within the housing which establishes an initial brush force. As the brush wears the length inside the housing decreases and decompresses the spring causing a gradual decrease in brush force. This variation can increase brush wear since a given brush compound typically has an optimum range of brush force. This problem was solved by one brush assembly in the art that incorporated constant force springs. Each spring was configured as a reeled metal tape that unreeled as the brush was inserted into the housing. The metal tape reeled back onto the spring as the brush length shortened due to wear. This type of spring proved susceptible to mechanical failure and fatigue during service.

Some brush assemblies in the art have a lid that is removably attached to the housing with screws. The springs are sandwiched between the lid and the brushes within the housing. In at least one prior lid design, the springs merely rest against the lid without being fixed relative to the lid. This arrangement renders the lid difficult to install since the springs must be compressed and have a tendency to slip to one side as the lid is installed. According to other known brush assemblies, holes are provided in the lid in which gauge pins are inserted to measure brush wear. The distance the rod travels before contacting a brush indicates an amount of brush wear. However, other known brush assemblies fail to incorporate wear gauge holes.

Another consideration in propeller ice protection systems involves lightning strike protection. A lightning strike in the proximity of the propeller can feed through the power lines and damage the power system. A transient voltage suppressor may be connected across each power line and the system ground in order to prevent such an occurrence. The transient voltage suppressor acts as an open switch during normal system operation and as a closed switch when a high magnitude transient voltage potential appears across the power line and the system ground. The high potential is thereby shunted to ground when a lightning strike occurs. A metal oxide varistor (MOV) is commonly used for this purpose. According to one common embodiment, the transient voltage suppressor is attached to the mounting bracket spaced from the brush assembly. Leads connect the transient voltage suppressor across each power line connection and ground connection on the brush assembly. The leads present an extra impedance in the shunt circuit between the transient voltage suppressor and the brush assembly which reduces the effectiveness of the shunt circuit. Also, connecting the leads to the brush assembly is an extra step and may be inadvertently omitted leaving the power supply system unprotected from lightning strike.

As is apparent from the previous discussion, an improved brush assembly is desired. In particular, a brush assembly having improved accessibility and a simplified mounting arrangement is desired. A brush assembly having minimized brush force variation with long spring life and minimized brush tip is desired. A lid having wear gauge holes and means for efficiently positioning the springs during installation is desired. And finally, a brush assembly having minimized impedance between the transient voltage suppressor and the power system connection and an automatically connected transient voltage suppressor is desired.

SUMMARY OF THE INVENTION

According to an aspect of the invention, a brush assembly is provided for conducting electrical power from a fixed power system to a rotating ice protection system through a slip ring assembly having a plurality of slip rings, the brush assembly being adapted to attach to a mounting bracket, comprising:

a plurality of electrically conductive brushes for conducting electrical power to the slip rings with at least one brush per slip ring;

a plurality of springs with at least one spring per brush for urging each brush against a slip ring;

a housing having a brush enclosure with a plurality of apertures for receiving the plurality of springs and for slidably receiving the plurality of brushes in alignment with the slip rings, and an attachment leg extending from the brush enclosure adapted to attach the housing to the mounting bracket with the brush enclosure spaced to one side of the mounting bracket;

a plurality of electrical connectors attached to the housing for connection with the power system, at least one electrical connector corresponding to each slip ring; and, a plurality of flexible shunts with at least one flexible shunt per brush that electrically connects each brush that aligns with a single slip ring to the electrical connector corresponding to that slip ring.

According to another aspect of the invention, a brush assembly is provided for conducting electrical power from a fixed power system to a rotating ice protection system through a slip ring assembly having a plurality of slip rings, the brush assembly being adapted to attach to a mounting bracket, comprising:

a plurality of electrically conductive brushes for conducting electrical power to the slip rings with at least on brush per slip ring;

a plurality of springs with at least one spring per brush for urging each brush against a slip ring;

a housing having a plurality of apertures for receiving the plurality of springs and for slidably receiving the plurality of brushes in alignment with the slip rings, the housing being adapted to attach to the mounting bracket;

a plurality of electrical connectors attached to the housing for connection to the power system, at least one electrical connector corresponding to each slip ring, the plurality of electrical connectors having a first electrical connector that connects to power system ground and a second electrical connector that receives electrical power from the power system;

a plurality of flexible shunts with at least one flexible shunt per brush that electrically connects each brush that aligns with a single slip ring to the electrical connector corresponding to that slip ring; and, a transient voltage suppressor disposed within the housing electrically connected across the first and second connectors, the transient voltage suppressor functioning as an open switch during normal system operation and as a closed switch when a high electrical potential induced by a lightning strike appears across the first and second electrical connectors.

According to an aspect of the invention, the brush assembly provides improved accessibility and a simplified mounting arrangement that results in a higher quality installation. According to another aspect of the invention, the brush assembly has a minimized brush force variation with long spring life and minimized brush tip resulting in improved brush performance and wear life. According to a further aspect of the invention, an internally mounted transient voltage suppressor is provided with minimized impedance between the transient voltage suppressor and the power system connection thereby providing improved lightning protection. These and other features are provided which will be described in detail and represent further improvements over prior brush assemblies.

BRIEF DESCRIPTION OF THE DRAWINGS

FIG. 2A presents a detailed view of the brush assembly mounting arrangement according to the invention as seen facing the front of the engine along line 2A—2A of FIG. 1.

FIG. 2B presents a detailed view of the brush assembly mounting arrangement according to the invention from the back of the mounting bracket as seen facing the propeller assembly along line 2B—2B of FIG. 1.

DETAILED DESCRIPTION

Figure 1:
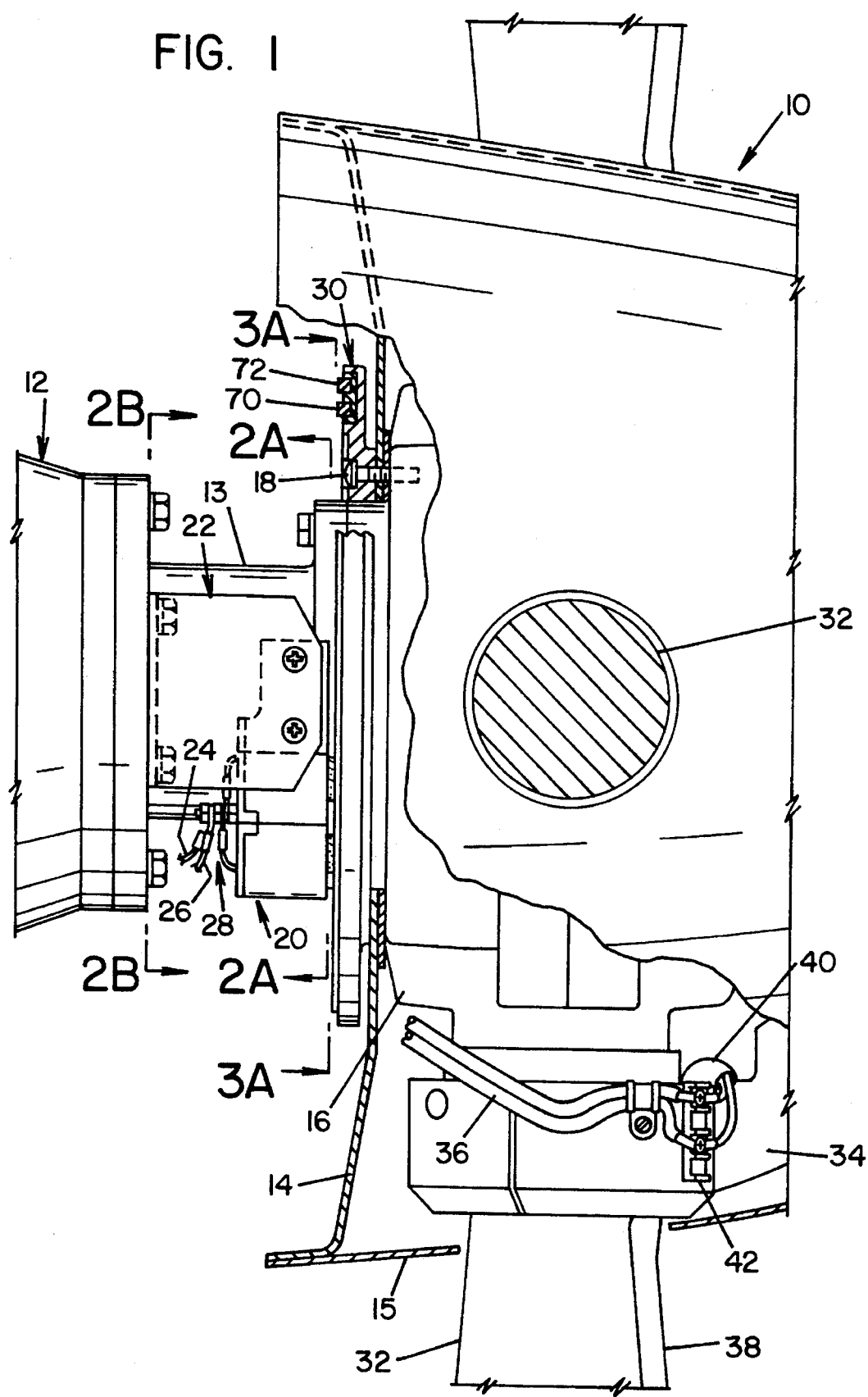
FIG. 1 presents a schematic general arrangement view of an electrothermal propeller de-icing system having a brush assembly according to the invention.

Referring to FIG. 1, a propeller assembly 10 is shown attached to an aircraft engine 12. A brush assembly 20 according to the invention is shown attached to a mounting bracket 22 at the front of the engine 12. Electrical leads 24 and 26 from the ice protection system power supply (not shown) are attached to an electrical power connection 28 attached to the brush assembly 20. A flat slip ring assembly 30 faces the brush assembly 20. The manner in which power is conducted from the electrical power connection 28 through brush assembly 20 to slip ring assembly 30 will be explained more fully with reference to FIGS. 2 through 10.

Still referring to FIG. 1, the slip ring assembly 30 is attached to a spinner bulkhead 14 and a propeller hub 16 by several mounting screws 18. The propeller assembly 10 is attached to the engine 12 by several bolts (not shown) that attach engine drive shaft 13 to propeller hub 16. A spinner dome 15 attaches to bulkhead 14 and serves as a streamlined cover for the hub 16 and other components within the dome. A plurality of propeller blades 32 are mounted to the propeller hub 16. An electrothermal propeller de-icer 38 is shown attached to the leading edge of the propeller blade 32 as is well known in the art. A counterweight 34 is attached to the propeller blade 32. A wire harness 36 is shown attached to the counterweight 34. De-icer leads 40 wrap around beneath the counterweight and attach to terminal strip 42. The wire harness 36 also attaches to terminal strip 42 and serves to transfer electrical power from slip ring 30 to the de-icer leads 40. The other end of the wire harness (not shown) is attached to the back of the bulkhead 14 and connects to power leads (not shown) from the slip ring assembly 30. Such arrangements for transferring power from a slip ring assembly to a propeller de-icer 38 are well known in the art.

Referring now to FIG. 2A, mounting bracket 22 is attached to the front of engine 12 at two locations. Mounting bracket 22 has a bracket cantilever 64 that extends from a bracket flange 66. The engine cover plate studs 50 and cover plate nuts 52 are conveniently used to mount the mounting bracket flange 66 to the engine in two locations. Brush assembly 20 includes a housing 58 that comprises a brush enclosure 60 and terminates in an attachment leg 62 that extends from brush enclosure 60. Attachment leg 62 is adapted to attach the mounting bracket 22 with the brush enclosure spaced to one side of the bracket 22. More specifically, the brush enclosure should be spaced to one side of the bracket flange 66. Thus, the brush enclosure 60 is shifted parallel to the plane of rotation of the assembly slip ring 30 away from the mounting bracket 22 along the slip rings 70 and 72. This arrangement presents many advantages which will be discussed more fully. Mounting screws 56 pass through the bracket cantilever 64 and engage attachment leg 62. This is known as an "inside" mounting arrangement because the brush assembly 20 is mounted between the bracket cantilever 64 and the engine drive shaft 13. A spacer 54 is located between mounting bracket 22 and attachment leg 62 in order to radially align brushes 46 with slip rings 70 and 72 (shown in phantom).

A plurality of electrically conductive brushes 46 for conducting electrical power to the slip rings are slidably received within a plurality of apertures in the brush enclosure 60. The brushes are shown as having a rectangular cross-section, but other cross-sectional shapes could work equally well in the practice of the invention, such as round or polygonal. The brushes must be in alignment with the slip rings. Biasing means are provided for urging each brush against a slip ring. Thus, brushes 46 and slip rings 70 and 72 form a plurality of sliding contacts. Electrical power is conducted from the brushes 46 of fixed brush assembly 20 through the plurality of sliding contacts to the rotating slip rings 70 and 72 of slip ring assembly 30.

Referring now to FIG. 2B, brushes 46 are shown riding on slip rings 70 and 72. The slip rings and 72 are mounted within slip ring assembly 30, as will be explained more fully with respect to FIGS. 3A and 3B. Still referring to FIG. 2B, a power connection means 28 for electrically connecting the brush assembly to the power supply system is attached to the back of housing 58 where leads 24 and 26 are connected. The power connection means includes two electrical connectors which, here, are two conductive studs 102 and 104. Electrical power is transferred from the power connection means 28 to the brunches 46 by jumper means which, here, are flexible shunts 110 and 112. Note that there is at least one flexible shunt per brush that electrically connects each brush that aligns with a single slip ring to the electrical connector 102 and 104 corresponding to that slip ring. Electrical power is conducted from the brushes 46 of fixed brush assembly 20 to the rotating slip rings 70 and 72 of slip ring assembly 30 through a sliding contact formed between each brush and slip ring. Slip rings 70 and 72 are preferably formed from a copper alloy, as is well known in the art. Suitable brush compounds are available from National Electrical Carbon Corporation, Greenville, S.C., U.S.A.

Referring again to FIG. 2A, a principal advantage of the invention is now evident. Brush assembly 20 must be precisely mounted and aligned with the slip ring assembly in order to transfer power efficiently. An improperly mounted brush assembly also results in unacceptable brush and ring wear and increased system maintenance, Without attachment leg 62, the brush enclosure 60 would be mounted directly to the bracket cantilever 64. With such an arrangement, brush enclosure 60 would be located between the slip ring assembly and the bracket flange 66 rendering brushes 46 almost completely inaccessible. Such an arrangement renders properly installing the brush assembly extremely difficult and greatly increases the risk of a poor installation occurring. Attachment leg 62 greatly improves the installation and maintenance process by spacing the brush enclosure 60 and the brushes 46 to one side of the mounting bracket 22. Attachment leg 62 greatly improves accessibility which results in a more efficient and higher quality installation.

Another advantage is evident from FIG. 2B which presents a detailed view of the power connection means 28. Without attachment leg 62, the power connection means 28 would be concealed behind bracket flange 66. Such an arrangement renders attachment of power leads 24 and 26 extremely difficult and further complicates brush assembly installation. Attachment leg 62 spaces the power connection means 28 to one side of the mounting bracket 22 which increases accessibility and further improves the installation process.

Figure 3A:
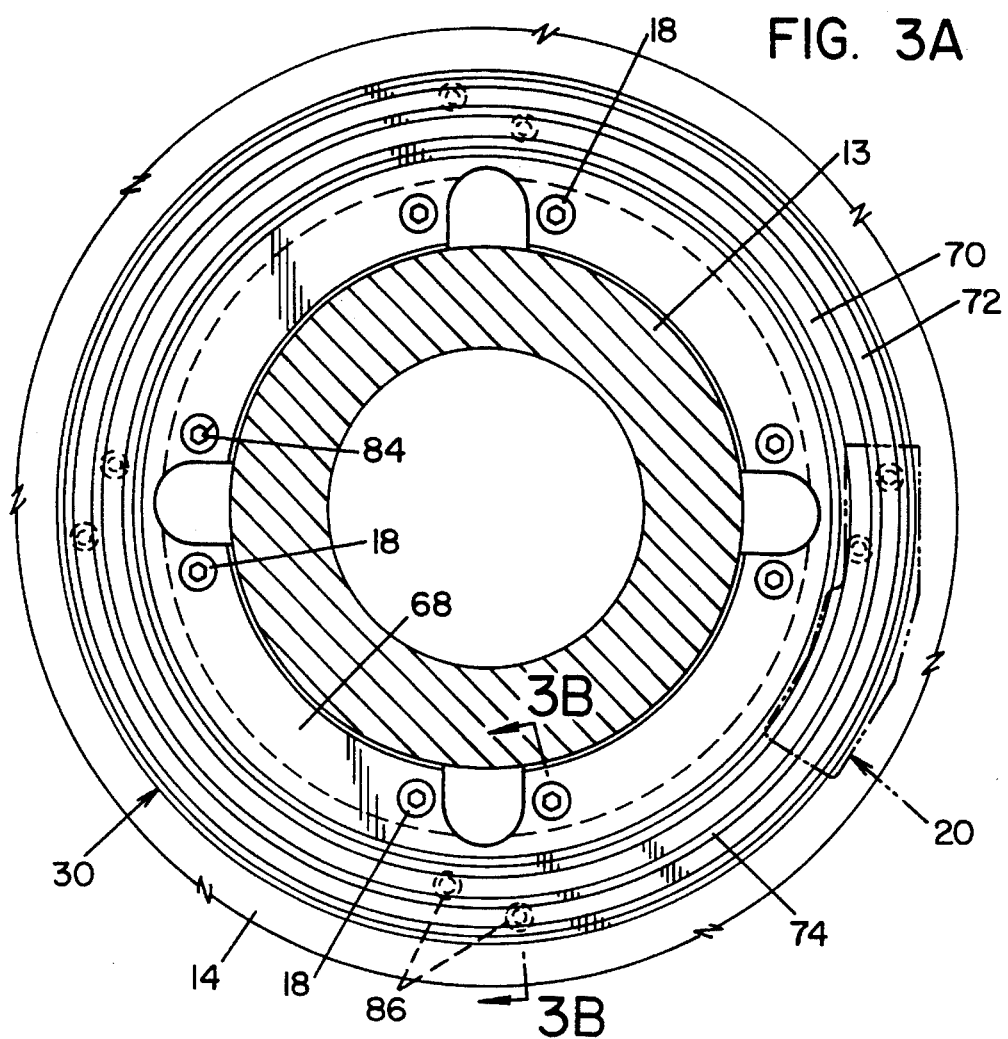
FIG. 3A presents a view of a slip ring assembly taken along line 3A—3A of FIG. 1.
Figure 3B:
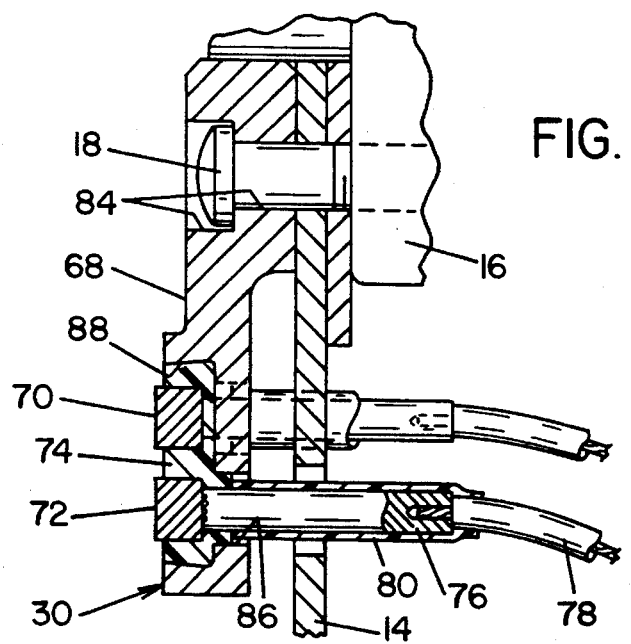
FIG. 3B presents a cross-sectional view of the slip ring assembly along line 3B—3B of FIG. 3A.

Referring to FIGS. 3A and 3B, more detailed views of the slip ring assembly 30 are presented. FIG. 3A presents a plan view of slip ring assembly 30 and FIG. 3B presents a sectional view of slip ring assembly 30 taken along line 3B—3B of FIG. 3A. A phantom outline of brush assembly 20 depicts the orientation of brush assembly 20 relative to slip ring assembly 30. Slip ring assembly 30 includes a slip ring holder 68 and slip rings 70 and 72 set into slip ring channel 88. Slip ring holder 68 may be manufactured from any material having suitable strength, preferably an aluminum alloy. Mounting holes 84 pass through the holder 68 at several locations. Mounting screws 18 pass through mounting holes 84 and attach the slip ring holder 68 to the propeller hub 16. A suitable epoxy potting compound 74 bonds the rings 70 and 72 into the channel 88 and also provides the necessary dielectric insulation between the individual rings 70 and 72 and the holder 68. Conductive studs 76 (only one shown) are spot welded to each ring and pass through several stud holes 86 in the holder 68. One stud is provided on each ring for each de-icer mounted on a propeller blade. A slip ring lead 78 is soldered into a hole in the stud 76. A stud insulation sleeve 80 insulates stud 76 and slip ring lead 78 where it is soldered to the stud 76.

Brush assembly 20 of FIG. 2A has four brushes, the plurality of apertures receiving two brushes 46 in alignment with one with slip ring 70 and two brushes in alignment with another slip ring 72. Utilizing multiple brushes per ring is advantageous in a high current system. Total current draw carried by a single brush that exceeds about 25–30 amps is generally considered to be a high current system. Multiple brushes split the current draw and reduce the current draw carried by the individual brushes. The maximum recommended current density per brush is a function of the brush compound and operating conditions. In lower current systems, a single brush per ring may be desirable. Any such variation is considered to be within the purview of the invention.

Figure 4:
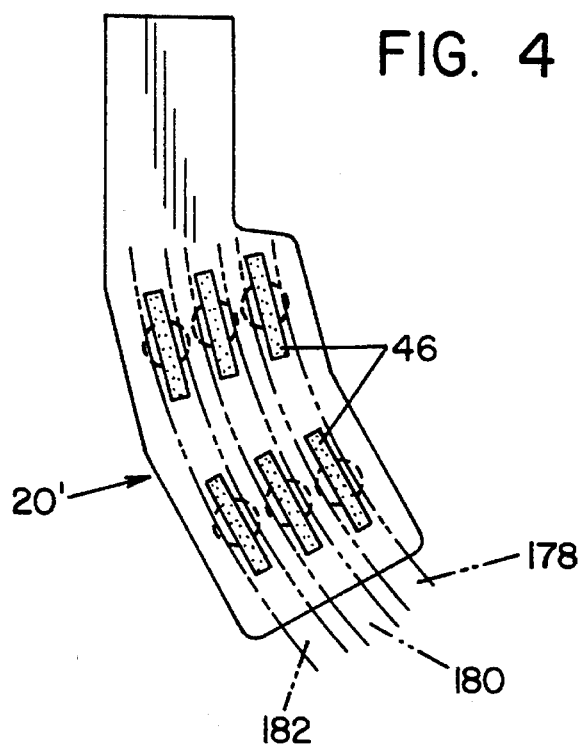
FIG. 4 presents a plan view of a brush assembly according to the invention having six brushes.
Figure 5:
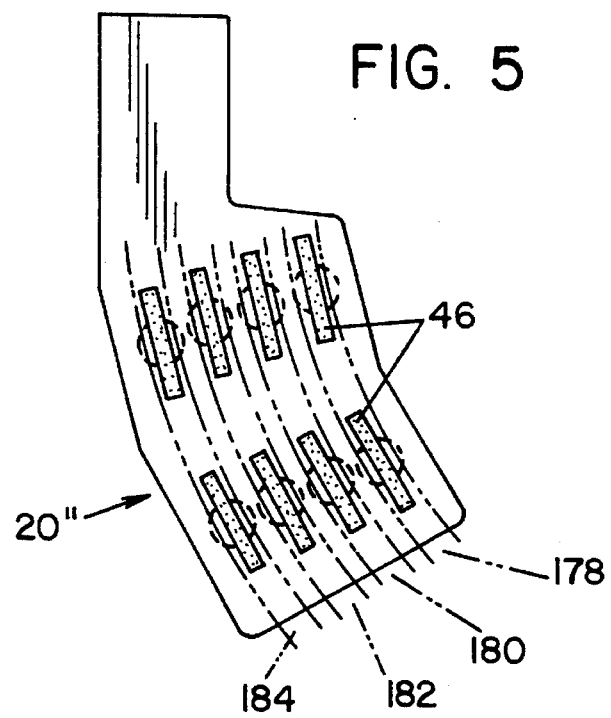
FIG. 5 presents a plan view of a brush assembly according to the invention having eight brushes.

Multiple slip rings may also be desirable depending on the application. A propeller ice protection system normally utilizes at least two rings. However, three ring systems are common, and four ring systems are known. Brush assembly embodiments according to the invention corresponding to three and four slip ring systems are presented in FIGS. 4 and 5. Referring to FIG. 4, brush assembly 20' has six brushes 46 with the apertures receiving two brushes in alignment with a first slip ring 178, two brushes in alignment with a second slip ring 180, and two brushes in alignment with a third slip ring 182. Each brush is aligned with its respective slip ring as presented with the two ring embodiment presented in FIG. 2A. Referring to FIG. 5, brush assembly 20" has eight brushes 46 with the apertures receiving two brushes in alignment with a first slip ring 178, two brushes in alignment with a second slip ring 180, two brushes in alignment with a third slip ring 182, and two brushes in alignment with a fourth slip ring 184. As discussed previously, a single brush per slip ring may be utilized in lower current systems. Such variations are considered to be within the purview of the invention.

Electrical power systems for propeller de-icing systems generally fall into two categories: direct current and alternating current. With a direct current power system one of the slip rings normally corresponds to power system ground, such as ring 70 (FIGS. 3A and 3B). The brushes riding on this ring are connected to power system ground through the brush assembly 20. The other ring 72 (FIGS. 3A and 3B) corresponds to system power. The brushes riding on this ring are connected to a power supply line from the system controller (not shown) that receives a higher electrical potential relative to power system ground. The roles of these rings could easily be interchanged. Additional rings are required if additional power lines are required to power the propeller ice protection system. For example, a three ring direct current system would have one ground ring and two power rings, A four ring direct current system would have one ground ring and three power rings.

With an alternating current system, the individual slip rings may correspond to individual phases in a three phase power supply system, or some of the rings may correspond to individual phases with one ring corresponding to system ground. For example, in a two ring system, one of the rings could correspond to a single power phase and one of the rings could correspond to power system ground. In such a case, the ice protection system would draw power from only one power phase. Alternatively in a two ring system each of the rings could correspond to one of the phases, in which case the ice protection system would draw power from two phases. In a three ring system, each of the rings could correspond to one of the phases in which case the ice protection system would draw power from all three phases. Finally, a ground ring could be added to a three ring system resulting in a four ring system. These variations are presented to provide a more complete explanation of the invention and are not intended to limit the scope of the invention since a large number of variations in electrical connection are possible. In any of these embodiments, the rings are connected to ground or power through the brushes 46, as will be discussed in more detail.

Figure 6:
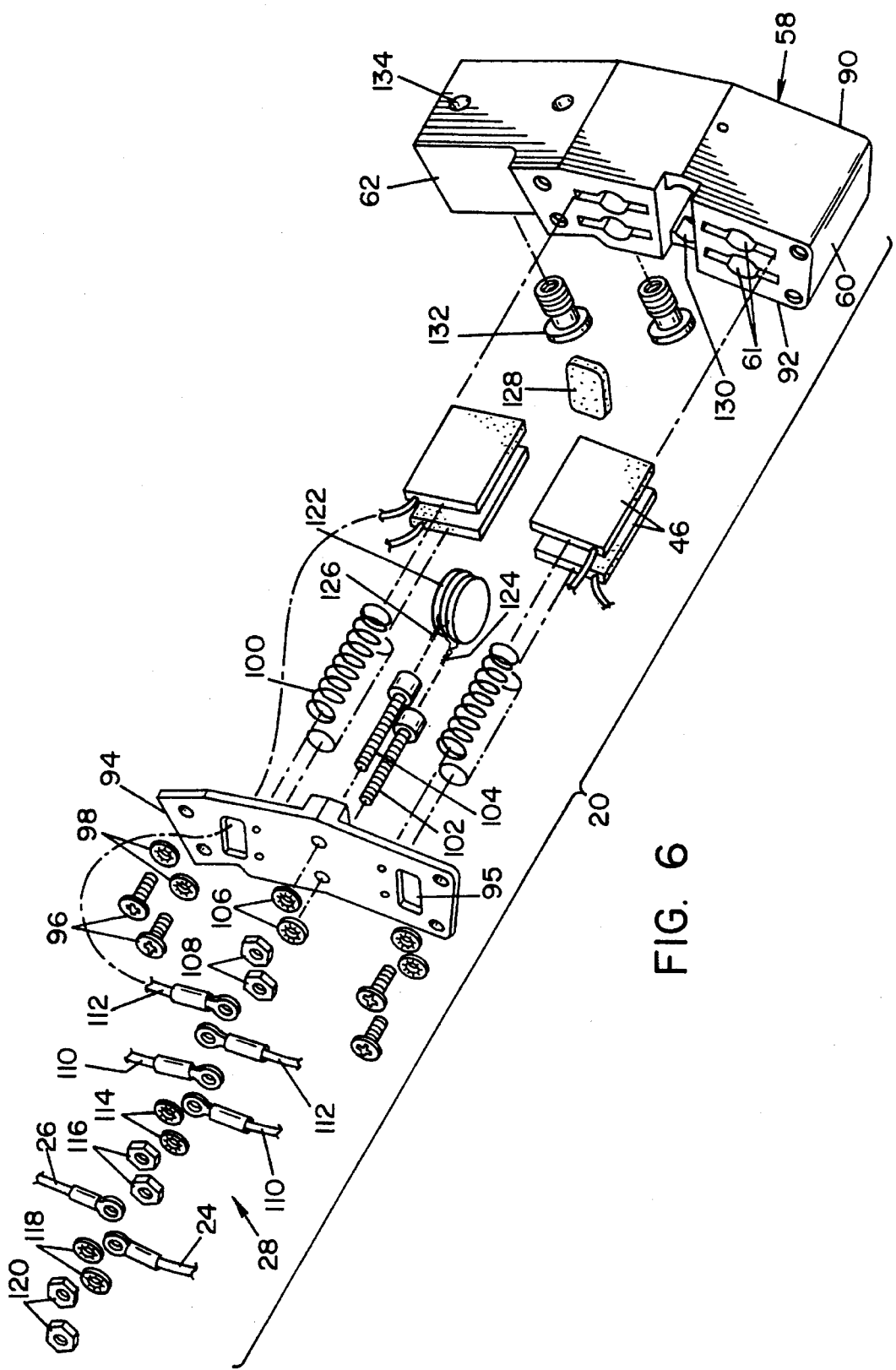
FIG. 6 presents an exploded isometric view of a brush assembly according to the invention.

Referring to FIG. 6, a detailed exploded view of brush assembly 20 is presented. Brush assembly housing 58 comprises brush enclosure 60 and attachment leg 62. Brush enclosure 60 and attachment leg 62 are preferably formed as in integral unit, and may be molded to shape in one piece from an appropriate fiber reinforced plastic molding compound. They can also be machined to shape in one piece from a solid molded block of fiber reinforced plastic material. In either case, a chopped fiberglass reinforced polyester molding compound is preferred such as catalogue number EB7000 available from Cuyahoga Molded Plastics Corporation, Cleveland, Ohio, U.S.A., or catalogue number Haysite 270FR available from Haysite Reinforced Plastics, Erie, Pa., U.S.A. Other molding compounds having equivalent properties are equally suitable, including fiber reinforced epoxies, and are considered to be within the purview of the invention. Brush enclosure 60 and attachment leg 62 could also be formed in separate pieces and subsequently fabricated together, which is also considered to be within the purview of the invention.

Brush enclosure 60 is formed with a plurality of apertures 61 that slidably receive a plurality of brushes 46. Brush enclosure 60 has a first surface 90 that faces the slip ring assembly (not shown) and an opposing second surface 92 spaced from the first surface 90. In a preferred embodiment, a lid 94 is removably affixed to the second surface 92 at four locations with lid screws 96 and lock washers 98. In this embodiment, the housing 58 comprises the brush enclosure 60, the attachment leg 62, and the lid 94. The lid 94 may be formed by machining a fiber reinforced plastic plate, but is preferably molded to shape using the same molding compounds previously described in relation to brush enclosure 60 and attachment leg 62. If lid 94 is machined from a plate, a preferable material is an epoxy fiberglass plate according to NEMA (National Electrical Manufacturers Association) grade G-10.

Biasing means must be provided to bias the brushes 46 against the slip rings (not shown). Here, such biasing means includes a plurality of helical springs 100 disposed in compression between the lid 94 and the brushes 46. At least one spring 100 must be provided for each brush 46. The springs 100 are received within the apertures in the brush enclosure. Other types of springs may be equally suitable in the practice of the invention. Performance of brush assembly 20 may be further enhanced by selecting springs designed to certain parameters, as will be discussed in more detail in relation to FIG. 7A and 7B.

Referring still to FIG. 6, power connection means 28 is attached to the top of lid 94. Here, the power connection means comprises two electrical connectors or studs 102 and 104 that are threaded into and fixed to the lid 94. Lock washers 106 and nuts 108 lock the studs 102 and 104 in place. At least one electrical connector must correspond to each slip ring. Variations are possible without departing from the scope of the invention. For example, more than one stud per slip ring could be provided, in which case a group of studs corresponding to a single slip ring would constitute a single electrical connector. Likewise, a male or female shell-type connector having a plurality of connectors could be attached to the lid 94.

Regardless of the type of power connection means 28 utilized, some type of jumper means for transferring electrical power from the power connection means 28 to the plurality of brushes 46 is required. Here, such jumper means comprise flexible shunts 110 and 112. Flexible shunts 110 and 112 are formed from an insulated multiple stranded wire. One end of each shunt is preferably integrally formed into the corresponding brush 46. The other end of the shunt passes through an aperture 95 in lid 94 and is preferably terminated in a ring terminal that is clamped to one of studs 102 and 104 using lock washers 114 and nuts 116. Note that at least one flexible shunt 110 or 112 per brush is provided that electrically connects each brush aligned with a single slip ring to the electrical connection 102 or 104 corresponding to that slip ring. For example, two of brushes 46 that align with a single slip ring (see FIG. 2A) are connected to a first electrical connector 102 via flexible shunts 110. The two brushes that align with the other slip ring (see FIG. 2A) are connected to a second electrical connector 104 via flexible shunts 112. Other shunt and terminal arrangements are possible without departing from the scope of the invention. Lock washers 118 and nuts 120 are provided for attaching system power or ground leads 24 and 26, as required, to electrical connectors 102 and 104, as depicted in FIGS. 1 and 2B.

Another principal advantage of the invention is evident from FIG. 6. A transient voltage suppressor means 122 is connected across first and second electrical connectors 102 and 104, and is disposed within the housing. Here, the electrical connectors 102 and 104 are studs and the transient voltage suppressor means comprises a pair of metal oxide varistors (MOV) that are soldered together to form leads 124 and 126 which, in turn, are soldered into studs 102 and 104 respectively. Thus, the transient voltage suppressor 122 is connected across the electrical connectors 102 and 104. Studs 102 and 104 are preferably formed from a copper alloy with a 6–32 UNC-2A external thread. A suitable copper alloy is Naval Brass, Copper Alloy UNS C46400 per ASTM B21. A suitable metal oxide varistor is catalogue number V150ZA8 available from Harris Semiconductor, Melbourne, Fla., United States of America, having properties as described in a catalogue entitled "Transient Voltage Suppression Devices Fifth Edition," catalogue number 400.3, dated September, 1989, available from that company. At least two of these varistors are preferably connected in parallel as shown. The MOV manufacturer should be consulted when determining MOV characteristics for a particular application. Lightning testing may also be required.

The transient voltage suppressor means 122 functions as an open switch during normal system operation and as a closed switch when a high electrical potential induced by a lightning strike appears across electrical connectors 102 and 104. A first electrical connector 102 must be a ground connector that connects to system ground. A second electrical connector 104 must be a power connector that connects to the power supply system. This permits the transient voltage suppressor 122 to shunt the power connector to the ground connector when a lightning strike occurs. The roles of the electrical connectors 102 and 104 can be reversed without effecting transient voltage suppressor performance as long as one of the electrical connectors is connected to power system ground. This arrangement prevents feedback of high potential induced by lightning strike into the power system by shunting the high potential to ground. The transient voltage suppressor means can include several MOV's if there are more than one power connectors, with an MOV for each power connector.

Directly connecting the transient voltage suppressor 122 to the electrical connectors 102 and 104 within housing 58 greatly reduces the electrical impedance in the shunt circuit. Reducing the electrical impedance in the shunt circuit increases the effectiveness of the transient voltage suppressor 122. This is an advantage over previous arrangements where the transient voltage suppressor was mounted externally and was attached to electrical connectors 102 and 104 by relatively long wires.

A cavity 130 is provided within housing 58 for receiving the transient voltage suppressor 122. A resilient pad 128 is disposed inside cavity 130 within housing 58. Upon installation of lid 94, pad 128 is compressed between the bottom of cavity 130 and the transient voltage suppressor 122 and restrains the transient voltage suppressor 122 against vibration. This feature is presented more clearly in FIGS. 7A and 10B where a sectional views of brush enclosure 60 are presented. The transient voltage suppressor in previous brush assemblies was mounted externally on the mounting bracket and could be inadvertently left unconnected. The arrangement according to the invention is far more advantageous since the transient voltage suppressor 122 is automatically connected when the power leads are connected to studs 102 and 104.

Still referring to FIG. 6, metallic inserts 132 are provided aligned with apertures 134 for receiving mounting screws (screws 56 of FIGS. 2A and 2B). Each insert 132 is internally threaded to engage a mounting screw and is also engaged against rotation to the attachment leg 62. The details of inserts 132 will be discussed more fully in relation to FIG. 8. This arrangement represents an improvement over previous brush assemblies that use separate nuts and lock washers to engage the mounting screws. Aligning the brush assembly and installing the mounting screws could be very difficult with such an arrangement because one hand was needed to align the brush assembly, one hand was needed to engage and tighten the nuts and lockwashers, and another hand was needed to tighten the mounting screws. The arrangement of FIG. 6 greatly simplifies installation by permitting alignment of the brush assembly with one hand and tightening of the screws with the other hand.

Figure 7A:
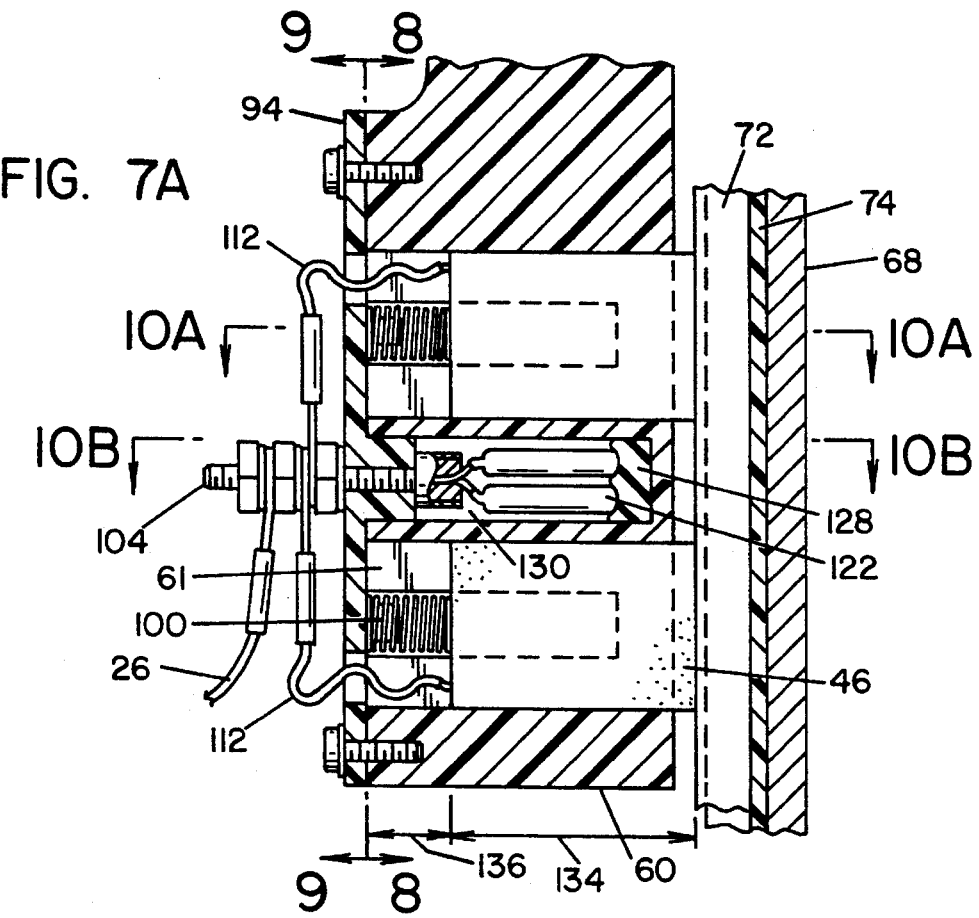
FIG. 7A presents a cross-sectional view along line 7A—7A of FIG. 2A of a brush assembly according to the invention having brushes in an "unworn" state.

As mentioned previously, the springs 100 may be chosen according to specific parameters resulting in optimized performance. A sectional view of brush enclosure 60 is presented in FIGS. 7A and 7B. FIG. 7A presents the "unworn" configuration with new brushes that have not yet been subjected to service. Referring to FIG. 7A, brushes 46 are shown slidably received within apertures 61 of brush enclosure 60. Flexible shunt 112 electrically connects each brush to stud 104. Helical springs 100 are disposed in compression between the brushes 46 and the lid 94. Springs 100 urge the brushes 46 against slip ring 72. Each brush 46 is urged by a single helical spring in the preferred embodiment, but multiple springs may be used with each brush in accordance with the optimization principles about to be discussed. Each brush 46 has an unworn length 134 and defines an unworn clearance 136 between that brush 46 and the lid 94 within each aperture 61. Each helical spring 100 is compressed within the unworn clearance 136 between each brush 46 and the lid 94. The spring 100 exerts a maximum brush force in this configuration since the brush is not worn and the spring 100 is compressed a maximum amount.

Figure 7B:
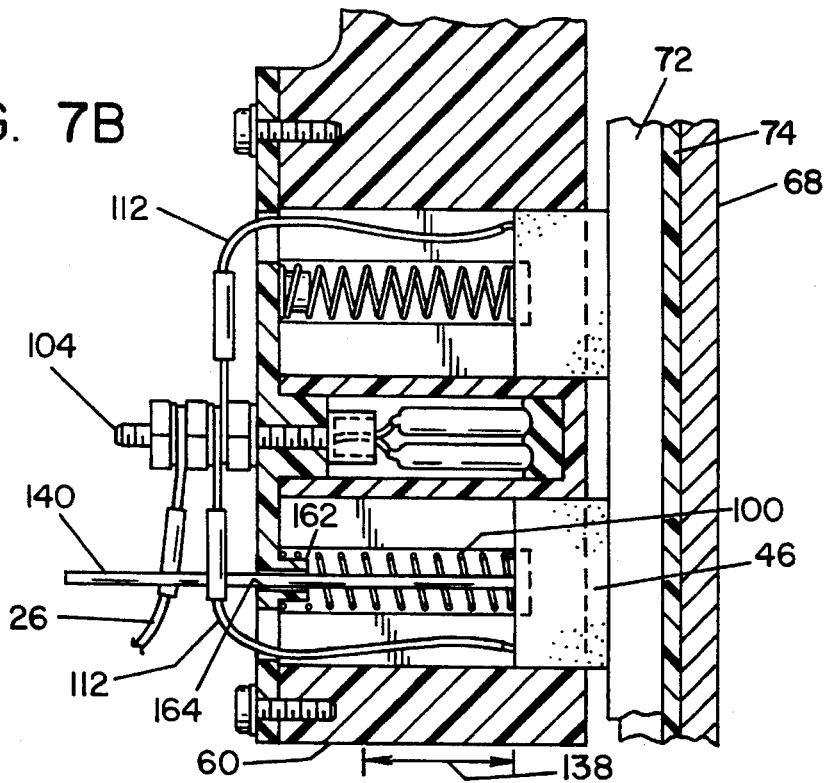
FIG. 7B presents a cross-sectional view along line 7A—7A of FIG. 2A of a brush assembly according to the invention having brushes in a "worn" state.

FIG. 7B presents the "worn" configuration with old brushes that have been subjected to service and are worn to the point where they must be replaced. Thus, each brush has a maximum wear length 183 by which the unworn length 136 is reduced during service and in excess of which requires replacement of the brush. The spring 100 exerts a minimum force in this configuration since the spring is uncompressed relative to the unworn clearance 136 by a distance approximating the maximum wear length 138. The difference between the maximum and minimum forces is clue to the fact that a helical spring has a spring constant, and spring force inherently changes with the amount of spring compression. There are a class of springs known as "constant force springs" that have spring constants that are essentially zero. However, prior constant force springs used in brush assemblies for aircraft propeller ice protection systems are susceptible to failure in fatigue from vibration. Helical springs have better fatigue resistance. Therefore, a helical spring is desired having a minimized spring constant.

According to the invention, spring constant may be minimized in the context of brush assembly 20 according to the following considerations. Each spring 100 has a solid height closely corresponding to and less than the unworn clearance 136. "Solid height" is a term of art that refers to the state of the spring when the spring is compressed to the point where the individual coils are in contact. Equations for calculating solid height are known in the art and vary according to whether the spring has open ends, open and ground ends, closed ends, or closed and ground ends. Closed ends (unground) are preferred in the practice of the invention, for which the solid height is calculated according to Equation 1 below:

$$H = d(n+3) \qquad \text{Eqn. (1)}$$

wherein H is the solid height measured in inches, d is the diameter of the wire (round) used to make the spring measured in inches, and n is the number of active coils.

Each spring 100 applies a maximum brush force to each brush 46 when each spring 100 is compressed to the unworn clearance 136. The maximum brush force is chosen as a design parameter and depends on several parameters including the brush and slip ring compounds, the current density in the brush, and the relative speed between the brush and the slip ring. A particular combination of brush and slip ring has an optimum range of brush force.

Each spring 100 has a maximum spring stress corresponding to the maximum brush force which is calculated according to Equation 3 below:

$$S = \frac{8PD}{\pi d^3} \qquad \text{Eqn. (2)}$$

wherein S is the maximum brush stress measured in pounds per square inch, P is the maximum brush force measured in pounds, D is the mean coil diameter of the spring measured in inches and d is the diameter of the wire (round) used to make the spring measured in inches. The maximum stress calculated according to Equation 2 must be multiplied by the Wahl curvature-stress correction factor according to Equation 3 below:

$$K = \frac{4C-1}{4C-4} \qquad \text{Eqn. (3)}$$

wherein K is the stress correction factor (dimensionless) and C=D/d (dimensionless). The spring 100 must be designed such that a maximum stress corresponding to the maximum brush force is within the limits of stress necessary to prevent permanent set and spring fracture during service.

Spring rate for spring 100 is calculated according to Equation 4 below:

$$R = \frac{Gd^4}{8nD^3} \qquad \text{Eqn. (4)}$$

wherein R is the spring rate measured in pounds per inch of deflection, G is the modulus of rigidity of the spring material measured in pounds per square inch, d is the diameter of the wire (round) used to make the spring measured in inches n is the number of active coils, and D is the mean coil diameter of the spring measured in inches. Spring rate may also be calculated according to Equation 5 below:

$$R = \frac{P}{L-c} \qquad \text{Eqn. (5)}$$

wherein R is the spring rate measured in pounds per inch of deflection, P is the maximum brush force measured in pounds, L is the free length of the spring measured in inches, and c is the unworn clearance 136 measured in inches. The "free length" of a spring is a term of art that refers to the completely unloaded and uncompressed length of a spring.

As discussed previously, a large variation in brush force between the unworn and worn states depicted in FIG. 7A and 7B is undesirable. The spring rate R should be minimized in order to maximize brush performance. Maximizing the free length (L) of spring 100 minimizes spring rate. Therefore, a spring is desired having a maximized free length.

A spring made from a particular material having a maximized free length according to the invention is designed using Equations 1 through 5 in an iterative process. The following parameters constitute fixed inputs into the iterative process: unworn clearance (c), maximum brush force (P), spring coil mean diameter (D), and modulus of rigidity (G). The following parameters are unknown and must be determined using the input parameters in conjunction with Equations 1 through 5: free length (L), spring rate (R), spring wire diameter (d), maximum stress (S), the number of active coils (n), and solid height (H). The equations are further constrained by the requirement that the maximum stress (S) be less than a predetermined stress limit, and that the solid height closely correspond to but be less than the unworn clearance (c). Spring rate is minimized by maximizing free length in an iterative solution of Equations 1–5 within the constraints on solid height (H) and maximum spring stress (S). This calculation is complicated by the fact that readily available wire diameters are incremental which prevents exactly meeting the constraints. Custom wire diameters are available but are generally cost prohibitive unless very large numbers of spring are ordered from a spring manufacturer. Therefore, a wire size must be chosen that comes closest to meeting the constraints. The limit on maximum stress is material dependent, but is generally about 40%–45% of the yield strength of the spring material.

In a certain preferred embodiment, unworn clearance (c) was 0.34 inch, maximum brush force (P) was 0.84 pounds, spring coil mean diameter (D) was 0.264 inch, and modulus of rigidity (G) was 10 million psi for an AISI 302/304 stainless steel spring material per ASTM A313. The stress limit necessary to prevent permanent set and spring fracture during service was about 138,000 psi. Based on these parameters and constraints, the maximized free length (L) was 2.25 inches with a spring rate (R) of 0.44 pounds per inch, spring wire diameter (d) was 0.017 inch, maximum corrected stress was about 130,000 psi, the number of active coils (n) was 12.9, and solid height (H) was 0.273 inch. Note that the solid height of 0.273 inches closely corresponded to but was less than the unworn clearance of 0.34 inch and that the maximum corrected stress of 130,000 was less than the stress limit of 138,000 psi. This spring design resulted in an initial unworn (maximum) brush force of 0.84 pounds at a compressed length of 0.34 inch (as depicted in FIG. 7A), and a final worn brush force of 0.52 pounds at a compressed length of 1.06 inch (as depicted in FIG. 7B). The difference between the maximum brush force and the minimum brush force was thus about 38% of the maximum brush force. This difference preferably does not exceed approximately 40% of the maximum brush force.

Figure 8:
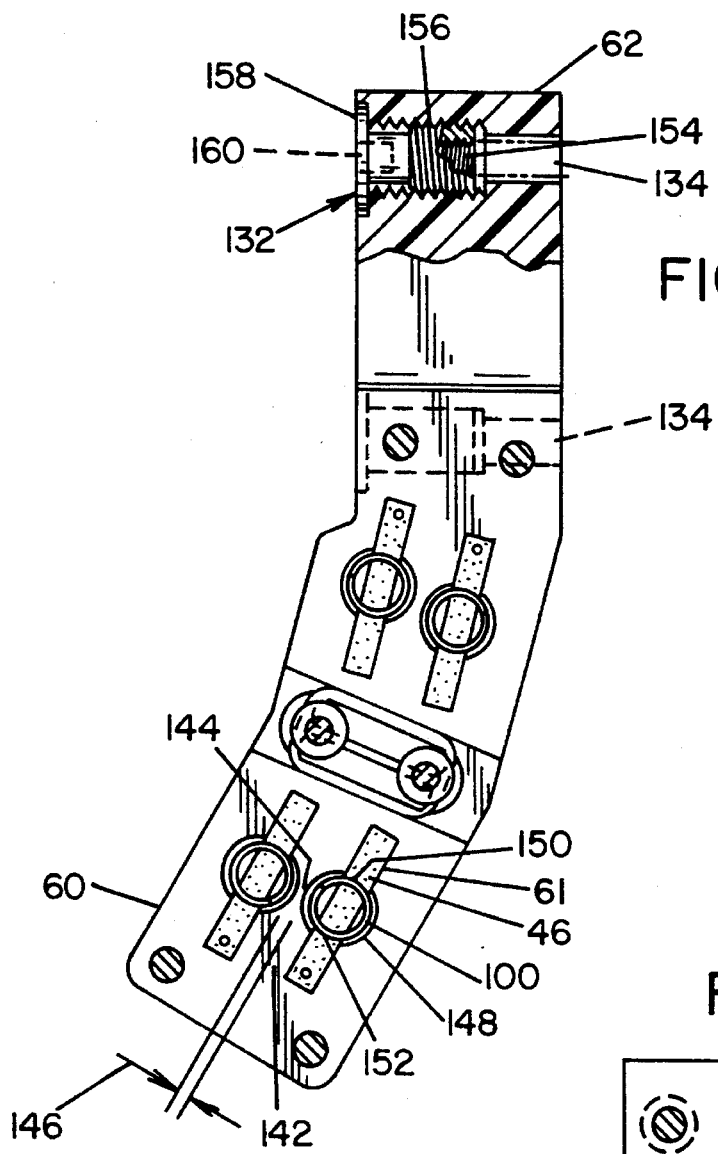
FIG. 8 presents a detailed view of the top of a brush assembly according to the invention with the lid removed and a break-away section of the attachment leg.

Spring dimensions may be further optimized by considering how the spring force is applied to each brush. Referring to FIG. 8, brush enclosure 60 comprises two brushes 46 and two helical springs 100 placed in spaced side-by-side relationship with a partition 142 therebetween and a wall 144 between the helical springs 100. A spring clearance diameter 148 within brush enclosure 60 is slightly larger than the outside diameter of springs 100. Each helical spring 100 applies force to brush 46 at essentially two locations, the spring force application points 150 and 152. These points should be separated from each other as far as possible in order to minimize brush tip within aperture 61. With a helical spring, the distance between these points approximates the spring diameter. The distance between these points is approximately the mean spring (spring outside diameter minus wire diameter) diameter if the spring is formed from round wire. Maximizing spring coil diameter maximizes distance between spring force application points 150 and 152. However, the spring clearance diameter 148 increases as spring diameter increases. This results in a wall thickness 146 that decreases with increasing spring diameter to a minimum wall thickness. In any application, there is a minimum wall thickness including a margin for safety necessary to maintain structural integrity. Minimum wall thickness is determined by the brush enclosure material and how it is formed, i.e. molding or machining. In a certain embodiment, the minimum wall thickness was about 0.09 inch with a brush housing 60 molded from polyester loaded with chopped fiberglass and machined to final dimensions. According to the inventions, spring diameter is maximized within the constraint of minimum wall thickness. This optimized application of spring load to the brush minimizes the tendency of a brush to tip within the brush aperture.

The insert 132 first presented in FIG. 6 is presented with more detail in FIG. 8. Two apertures 134 are provided with an internally threaded portion 154 adapted to receive a mounting screw (not shown) that attaches the attachment leg 62 to the mounting bracket (not shown). Internally threaded portion 154 preferably forms a part of insert 132 which is aligned with the aperture 134 and also comprises an externally threaded portion 156, a flange 158, and a hexagonal socket 160. Insert 132 is preferably formed from a stainless steel alloy. According to this embodiment, a portion of each aperture 134 is internally threaded and engages the externally threaded portion 156 of the insert. In such manner, insert 132 is engaged against rotation to the attachment leg 62. Insert 132 could also be knurled on its outside diameter and molded into attachment leg 62. Other variations that achieve an equivalent result are considered to be within the purview of the invention. Flange 158 places a portion of attachment leg 62 in compression against the mounting bracket when the attachment leg 62 is attached to the bracket with a mounting screw. This arrangement prevents the externally threaded portion 156 from shearing through attachment leg 62. The possibility of shearing through the attachment leg becomes a more serious threat if the attachment leg 62 is formed from fiber reinforced plastic material.

Figure 9:
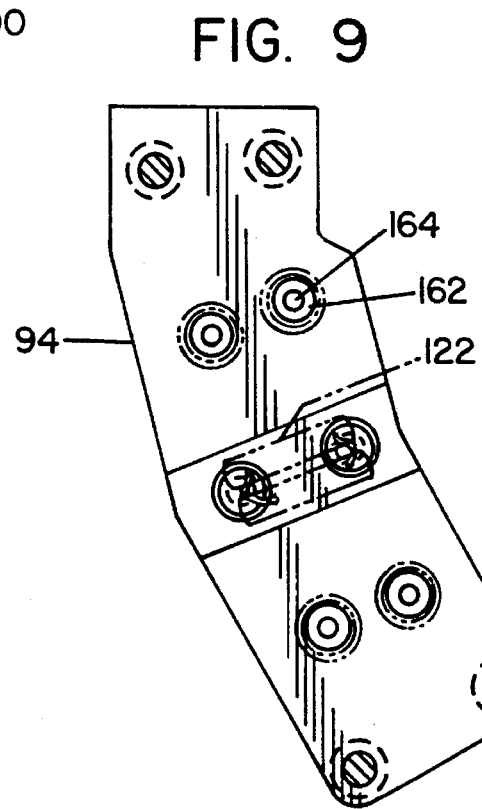
FIG. 9 presents a plan view of the underside of the brush enclosure lid taken along line 9—9 of FIG. 7A.

The underside of lid 94 is presented in FIG. 9. A plurality of seats 162 are formed in lid 94. A hole 164 is provided through each seat 162. Referring to FIG. 7B, one seat 162 is provided for each spring with each seat facing a brush 46. Each seat 162 engages the end of each spring 100. This arrangement greatly facilitates assembly, since the seats 162 prevent the ends of springs 100 from slipping off to the side while the springs 100 are compressed between the lid 94 and brushes 46 during installation of lid 94. An amount of brush wear may be determined by inserting a pin 140 through hole 164 until it rests against an individual brush 46. This arrangement conveniently combines the functions of seats 162 and holes 164, and permits measurement of brush wear without interference from the springs.

Figure 10A:
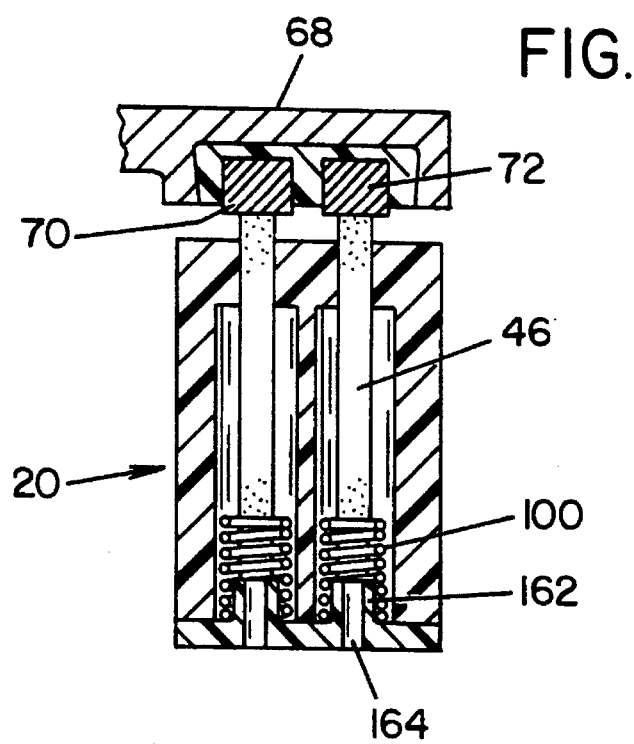
FIG. 10A presents a cross-sectional view of the brush assembly taken along line 10A—10A of FIG. 7A.

Referring to FIG. 10A, a sectional view of brush assembly 20 along line 10A—10A of FIG. 7A is presented. This view provides further detail of seats 162 engaging springs 100, thereby holding the spring ends in position. This view also provides further detail of the alignment of brushes 46 with slip rings 70 and 72.

Figure 10B:
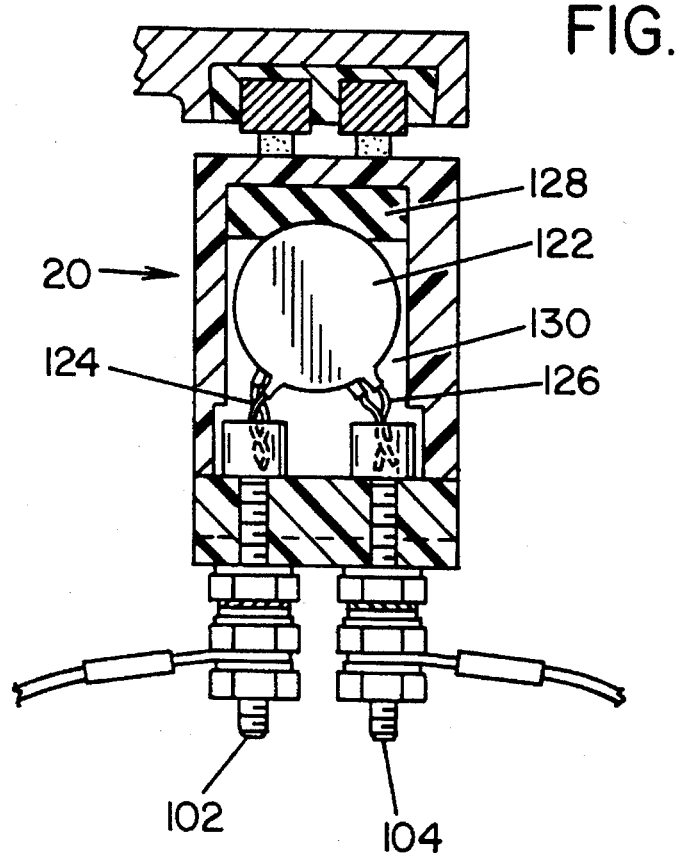
FIG. 10B presents a cross-sectional view of the brush assembly taken along line 10B—10B of FIG. 7A.

Referring to FIG. 10B, a sectional view of brush assembly 20 along line 10B—10B of FIG. 7A is presented. This view provides further detail of the MOV 122 within cavity 130. Note that the MOV compresses resilient pad 128 which restrains the MOV against vibration. Leads 124 and 126 are shown inserted into holes in studs 102 and 104 where they are soldered in place.

Figure 11:
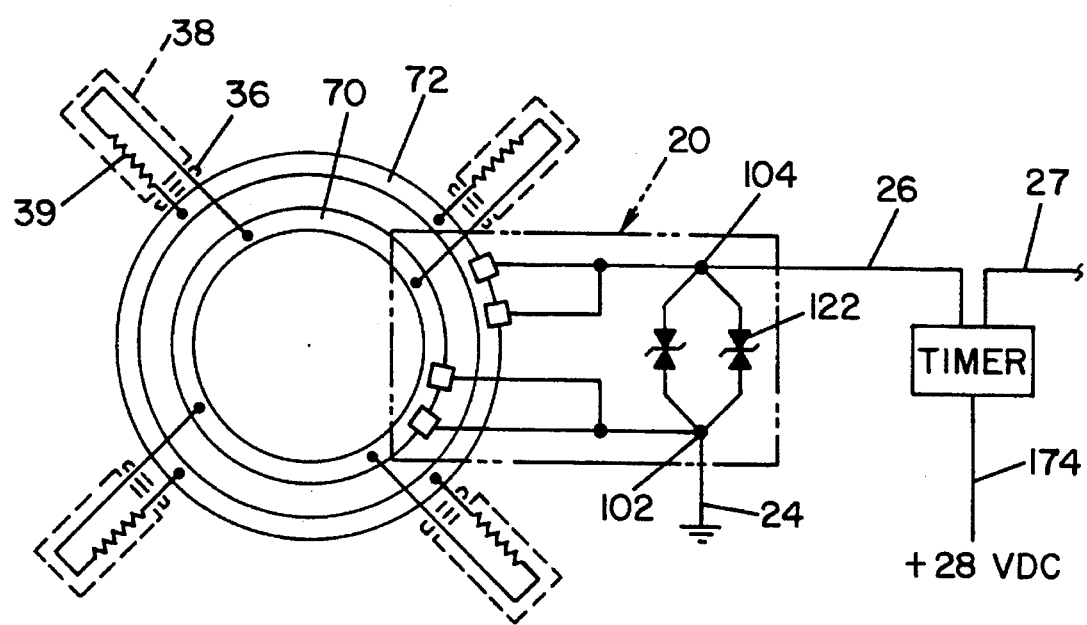
FIG. 11 presents an electrical schematic of an electrothermal propeller de-icing system utilizing the invention.

An electrical schematic of a representative propeller ice protection system is presented in FIG. 11. Only one propeller ice protection system corresponding to one engine is shown, the system corresponding to the other engine being a mirror image. The power supply system comprises a timer 168 electrically connected to an aircraft power bus via power line 174 which in this example supplies 28 VDC to the timer. A circuit breaker (not shown) and an ammeter (not shown) for monitoring system current may also be provided in series with the power line 174. The timer 168 switches electrical power from power line 174 to the individual leads 26 and 27, which are routed to each brush assembly. The timer 168 switches power to leads 26 and 27 in a predetermined timed sequence. Ring 72 is connected to electrical leads 26 through brush assembly 20. Ring 70 is connected to ground lead 24 through brush assembly 20. Ground lead 24 may also be routed through the timer. Power is transferred to resistive heaters 39 within de-icers 38 through flexible wire harnesses 36. Transient voltage suppressor 122, here an MOV, is shown connected across power lead 26 and ground lead 24 where the leads are connected to the brush assembly 20. With this arrangement, the transient voltage suppressor 122 may shunt any high potential in lead 26 induced by lightning strike the ground lead 24 as previously described. Though shown transferring power to resistive heaters, the invention would be useful in transferring power to any electrical load mounted on an aircraft propeller.

It is evident that many variations are possible without departing from the true scope and spirit of the invention as defined by the claims that follow.

We claim:

1. A brush assembly for conducting electrical power from a fixed power system to a rotating aircraft propeller through a flat slip ring assembly attached to the aircraft propeller and having a plurality of slip rings, the aircraft propeller being attached to an aircraft engine, said brush assembly being adapted to attach to a mounting bracket that is attached to the aircraft engine, comprising:

a plurality of electrically conductive brushes for conducting electrical power to the slip rings with at least one brush per slip ring;

a plurality of springs with at least one spring per brush for urging each brush against a slip ring;

a housing having a brush enclosure with a plurality of apertures for receiving said plurality of springs and for slidably receiving said plurality of brushes in alignment with the slip rings, and terminating in an attachment leg that extends from said brush enclosure, said attachment leg being adapted to attach to the mounting bracket with said brush enclosure shifted away from the mounting bracket along the slip rings parallel to the plane of rotation of the slip ring assembly;

a plurality of electrical connectors attached to said housing for connection with the power system, at least one electrical connector corresponding to each slip ring; and, a plurality of flexible shunts with at least one flexible shunt per brush that electrically connects each brush that aligns with a single slip ring to said electrical connector corresponding to that slip ring.

2. The brush assembly of claim 1, wherein the slip ring assembly has at least three slip rings, and wherein said plurality of brushes comprises at least three brushes.

3. The brush assembly of claim 1, wherein the slip ring assembly has at least four slip rings, and wherein said plurality of brushes comprises at least four brushes.

4. The brush assembly of claim 1, wherein said plurality of brushes comprises at least four brushes and said plurality of apertures are for receiving at least two of said brushes in alignment with one slip ring and at least two of said brushes in alignment with another slip ring.

5. The brush assembly of claim 1, wherein the slip ring assembly has at least three slip rings, said plurality of brushes comprises at least six electrically conductive brushes, and said plurality of apertures are for receiving at least two of said brushes in alignment with a first slip ring, at least two of said brushes in alignment with a second slip ring, and at least two of said brushes in alignment with a third slip ring.

6. The brush assembly of claim 1, wherein the slip ring assembly has at least four slip rings, said plurality of brushes comprises at least eight electrically conductive brushes, and said plurality of apertures are for receiving at least two of said brushes in alignment with a first slip ring, at least two of said brushes in alignment with a second slip ring, at least two of said brushes in alignment with a third slip ring, and at least two of said brushes in alignment with a fourth slip ring.

7. The brush assembly of claim 1, wherein a first electrical connector connects to power system ground and a second electrical connector receives electrical power from the power system, and further comprising a transient voltage suppressor disposed within said housing electrically connected across said first and second connectors, said transient voltage suppressor functioning as an often switch during normal system operation and as a closed switch when a high electrical potential induced by a lightning strike appears across said first and second electrical connectors.

8. The brush assembly of claim 7, wherein said plurality of electrical connectors comprises externally threaded brass studs fixed to said housing, and said transient voltage suppressor comprises a metal oxide varistor.

9. The brush assembly of claim 8, further comprising a resilient pad disposed within said cavity restraining said metal oxide varistor against vibration.

10. The brush assembly of claim 1, wherein said attachment leg has at least one aperture therethrough with an internally threaded portion, said aperture being to adapted to receive a mounting screw that attaches said attachment leg to the mounting bracket.

11. The brush assembly of claim 10, wherein said internally threaded portion comprises an internally threaded insert engaged against rotation to said attachment leg, said flange placing a portion of said attachment leg in compression against the mounting flange when the attachment leg is attached to the mounting bracket with the mounting screw.

12. The brush assembly of claim 1, wherein said brush enclosure has a first surface that faces the slip ring assembly and an opposing second surface spaced from said first surface, and said brush enclosure further comprises a lid removably affixed to said second surface with said springs disposed in compression between said lid and said brushes.

13. The brush assembly of claim 12, wherein said lid further comprises a plurality of seats with at least one seat for each spring, each seat engaging the end of each spring.

14. The brush assembly of claim 13, wherein each seat has a hole therethrough that permits a pin to be inserted into said housing and rest against an individual brush in order to determine an amount of brush wear.

15. The brush assembly of claim 1, wherein each brush is urged by a single helical spring having a mean diameter, each brush having an unworn length and defining an unworn clearance between said brush and said housing within each aperture, each helical spring being compressed within said unworn clearance between said brush and said housing within said aperture, each helical spring having a solid height closely corresponding to and less than said unworn clearance, a maximum brush force when the spring is compressed to said unworn clearance, a maximum stress corresponding to said maximum brush force within the limits of stress necessary to prevent permanent set and spring fracture during service, and a maximized free length resulting in a minimized spring rate within the constraints on solid height and maximum stress.

16. The brush assembly of claim 15, wherein at least two brushes and at least two helical springs are placed in spaced side-by-side relationship with a partition therebetween and a wall between said helical springs, said wall has a wall thickness that decreases to a minimum wall thickness as said mean diameter increases, said spring applies force to said brush at two locations approximately spaced from each other by said mean diameter which is maximized within the constraint of said minimum wall thickness.

17. The brush assembly of claim 15, wherein each brush had a maximum wear length by which said unworn length is reduced during service and in excess of which requires replacement of the brush, each spring exerts a minimum brush force when said helical spring is uncompressed relative to said unworn clearance a distance approximating said maximum wear length, and a difference between said maximum brush force and said minimum brush force does not exceed approximately 40% of said maximum brush force.

18. A brush assembly for conducting electrical power from a fixed power system to a rotating ice protection system through a slip ring assembly having a plurality of slip rings, said brush assembly being adapted to attach to a mounting bracket, comprising:
   a plurality of electrically conductive brushes for conducting electrical power to the slip rings with at least on brush per slip ring;
   a plurality of springs with at least one spring per brush for urging each brush against a slip ring;
   a housing having a plurality of apertures for receiving said plurality of springs and for slidably receiving said plurality of brushes in alignment with the slip rings, said housing being adapted to attach to the mounting bracket;
   a plurality of electrical connectors attached to said housing for connection to the power system, at least one electrical connector corresponding to each slip ring, said plurality of electrical connectors having a first electrical connector that connects to power system ground and a second electrical connector that receives electrical power from the power system;
   a plurality of flexible shunts with at least one flexible shunt per brush that electrically connects each brush that aligns with a single slip ring to said electrical connector corresponding to that slip ring; and,
   a transient voltage suppressor disposed within said housing electrically connected across said first and second connectors, said transient voltage suppressor functioning as an open switch during normal system operation and as a closed switch when a high electrical potential induced by a lightning strike appears across said first and second electrical connectors.

19. The brush assembly of claim 18, wherein the slip ring assembly has at least three slip rings, and wherein said plurality of brushes comprises at least three brushes.

20. The brush assembly of claim 18, wherein the slip ring assembly has at least four slip rings, and wherein said plurality of brushes comprises at least four brushes.

21. The brush assembly of claim 18, wherein said plurality of brushes comprises at least four brushes and said plurality of apertures are for receiving at least two of said brushes in alignment with one slip ring and at least two of said brushes in alignment with another slip ring.

22. The brush assembly of claim 18, wherein the slip ring assembly has at least three slip rings, said plurality of brushes comprises at least six electrically conductive brushes, and said plurality of apertures are for receiving at least two of said brushes in alignment with a first slip ring, at least two of said brushes in alignment with a second slip ring, and at least two of said brushes in alignment with a third slip ring.

23. The brush assembly of claim 18, wherein the slip ring assembly has at least four slip rings, said plurality of brushes comprises at least eight electrically conductive brushes, and said plurality of apertures are for receiving at least two of said brushes in alignment with a first slip ring, at least two of said brushes in alignment with a second slip ring, at least two of said brushes in alignment with a third slip ring, and at least two of said brushes in alignment with a fourth slip ring.

24. The brush assembly of claim 18, wherein said electrical connectors comprise externally threaded brass studs, and said transient voltage suppressor comprises a metal oxide varistor.

25. The brush assembly of claim 18, further comprising a resilient pad disposed within said cavity restraining said transient voltage suppressor against vibration.

26. The brush assembly of claim 18, wherein said brush enclosure has a first surface that faces the slip ring assembly and an opposing second surface spaced from said first surface, said brush enclosure further comprising a lid removably affixed to said second surface with said springs disposed in compression between said lid and said brushes.

27. The brush assembly of claim 26, wherein said electrical connectors are fixed to said lid.

28. The brush assembly of claim 26, wherein said lid further comprises a plurality of seats with at least one seat for each spring, each seat engaging the end of each spring.

29. The brush assembly of claim 28, wherein each seat has a hole therethrough that permits a pin to be inserted into said housing and rest against an individual brush in order to determine an amount of brush wear.

30. The brush assembly of claim 18, wherein each brush is urged by a single helical spring, each brush having an unworn length and defining an unworn clearance between said brush and said housing within each aperture, each helical spring being compressed within said unworn clearance between said brush and said housing within said aperture, each helical spring having a solid height closely corresponding to and less than said unworn clearance, a maximum brush force when the spring is compressed to said unworn clearance, a maximum stress corresponding to said maximum brush force within the limits of stress necessary to prevent permanent set and spring fracture during service, and a maximized free length resulting in a minimized spring constant within the constraints of solid height, maximum brush force and maximum stress.

31. The brush assembly of claim 31, wherein at least two brushes and at least two helical springs are placed in spaced side-by-side relationship with a partition therebetween and a wall between said helical springs, each spring has a mean diameter, said wall has a wall thickness that decreases with increasing mean diameter to a minimum wall thickness, said spring applies force to said brush at two locations approximately spaced from each other by said mean diameter which is maximized within the constraint of said minimum wall thickness.

32. The brush assembly of claim 31, wherein each brush has a length and a maximum wear length by which said length is reduced during service and in excess of which requires replacement of the brush, each spring exerts a minimum brush force when said helical spring is uncompressed relative to said unworn clearance a distance approximating said maximum wear length, and a difference between said maximum brush force and said minimum brush force does not exceed approximately 40% of said maximum brush force.

33. A brush assembly for conducting electrical power from a fixed power system to a rotating aircraft propeller through a flat slip ring assembly attached to the aircraft propeller and having a plurality of slip rings, the aircraft propeller being attached to an aircraft engine, said brush assembly being adapted to attach to a mounting bracket that is attached to the aircraft engine, comprising:

a plurality of electrically conductive brushes for conducting electrical power to the slip rings;

a housing having a brush enclosure with a plurality of apertures for slidably receiving said plurality of brushes and terminating in an attachment leg that extends from said brush enclosure, said attachment leg being adapted to attach to the mounting bracket with said brush enclosure shifted away from the mounting bracket along slip rings parallel to the plane of rotation of the slip ring assembly;

biasing means for biasing said plurality of brushes against the plurality of slip rings;

power connection means for electrically connecting said brush assembly to the power supply system; and, jumper means for transferring electrical power from said power connection means to said plurality of brushes.

34. A brush assembly for conducting electrical power from a fixed power supply system to a rotating ice protection system through a slip ring assembly having a plurality of slip rings, said brush assembly being adapted to attach to a mounting bracket, comprising:

a plurality of electrically conductive brushes for conducting electrical power to the slip rings;

a housing having a plurality of apertures for slidably receiving said plurality of brushes, said housing being adapted to attach to the mounting bracket;

biasing means for biasing said plurality of brushes against the plurality of slip rings;

power connection means for electrically connecting said brush assembly to the power supply system, said power connection means having at least one power connector that electrically connects to the power supply system and at least one ground connector;

jumper means for transferring electrical power from said power connection means to said plurality of brushes; and, transient voltage suppressor means disposed within said housing electrically connected across said power connector and said ground connector, said transient voltage suppressor functioning as an open switch during normal system operation and as a closed switch when a high electrical potential induced by a lightning strike appears across said power connector and said ground connector.

35. A brush assembly for conducting electrical power from a fixed power supply system to a rotating ice protection system through a slip ring assembly having a plurality of slip rings, said brush assembly being adapted to attach to a mounting bracket, comprising:

a plurality of electrically conductive brushes for conducting electrical power to the slip rings;

a housing having a brush enclosure with a plurality of apertures for slidably receiving said plurality of brushes and an attachment leg extending from said brush enclosure adapted to attach said brush assembly to the mounting bracket with said brush enclosure spaced to one side of the mounting bracket;

biasing means for biasing said plurality of brushes against the plurality of slip rings;

power connection means for electrically connecting said brush assembly to the power supply system, said power connection means including at least one power connector that electrically connects to the power supply system and at least one ground connector;

jumper means for transferring electrical power from said power connection means to said plurality of brushes; and, transient voltage suppressor means disposed within said housing electrically connected across said power junction and said ground junction, said transient voltage suppressor functioning as an open switch during normal system operation and as a closed switch when a high electrical potential induced by a lightning strike appears across said power connector and said ground connector.

36. In a combination of an aircraft engine having a drive shaft, a fixed power system, and a propeller assembly attached to the drive shaft that rotates relative to the aircraft engine, comprising:

(a) a flat slip ring assembly attached to the propeller assembly and having a plurality of slip rings;

(b) at least one electrothermal de-icer attached to the propeller and electrically connected to at least two of said plurality of slip rings;

(c) a mounting bracket attached to the aircraft engine; and, (d) a brush assembly attached to said mounting bracket and including,
a plurality of springs with at least one spring per brush urging each brush against a slip ring,
a housing having a brush enclosure with a plurality of apertures for receiving said plurality of springs and for slidably receiving said plurality of brushes in alignment with said slip rings, and terminating in an attachment leg that extends from said brush enclosure, said attachment leg being adapted to attach to said mounting bracket with said brush enclosure shifted away from said mounting bracket along said slip rings parallel to the plane of rotation of said slip ring assembly,
a plurality of electrical connectors attached to said housing for connection with the power system, at least one electrical connector corresponding to each slip ring, and a plurality of flexible shunts with at least one flexible shunt per brush that electrically connects each brush that aligns with a single slip ring to said electrical connector corresponding to that slip ring.

37. The combination of claim 36, wherein said mounting bracket comprises a bracket flange attached to the engine, and a bracket cantilever extending from said bracket flange, and said brush assembly is attached to said bracket cantilever.

38. The combination of claim 37, wherein said brush assembly is mounted between said bracket cantilever and the engine drive shaft.

39. The device of claim 1, wherein said brush enclosure and said attachment leg are formed as an integral unit.

40. The device of claim 39, wherein said housing is molded in one piece.

41. The device of claim 39, wherein said housing is machined from a solid block.

* * * * *